United States Patent [19]

Okuno et al.

[11] 4,190,338
[45] Feb. 26, 1980

[54] DATA RECORDING CAMERA

[75] Inventors: Youichi Okuno, Yokohama; Hideo Yokota, Tokyo; Mutsuhide Matsuda, Yokohama, all of Japan

[73] Assignee: Canon Kabushiki Kaisha, Tokyo, Japan

[21] Appl. No.: 943,355

[22] Filed: Sep. 18, 1978

[30] Foreign Application Priority Data

Sep. 21, 1977 [JP] Japan .................................. 52-114345
Sep. 21, 1977 [JP] Japan .................................. 52-114347

[51] Int. Cl.² ....................... G03B 17/24; G03B 13/02
[52] U.S. Cl. ..................................... 354/106; 354/225
[58] Field of Search ............... 354/106, 109, 219, 224, 354/225

[56] References Cited

U.S. PATENT DOCUMENTS

| 2,244,505 | 6/1941 | Sauer | 354/219 |
| 2,372,430 | 3/1945 | Kals | 354/224 X |
| 4,001,850 | 1/1977 | Fujita | 354/106 X |
| 4,028,713 | 6/1977 | Ohashi et al. | 354/225 X |
| 4,143,956 | 3/1979 | Miyagawa | 354/106 |

Primary Examiner—Donald A. Griffin
Attorney, Agent, or Firm—Toren, McGeady and Stanger

[57] ABSTRACT

A data recording camera capable of recording a data image on film as well as observing the data image through the view finder is disclosed. A beam splitter directs the light beam coming from the data to the film and view finder. The inner surface reflector of the beam splitter forms a ghost beam which forms a ghost image of the data on the film. The ghost image of the data is removed by a polarization filter (polar screen), wedge prism or thick glass plate.

5 Claims, 4 Drawing Figures

DATA RECORDING CAMERA

BACKGROUND OF THE INVENTION

1. Field of the Invention

The present invention relates to a data recording camera, particularly capable of recording a data image on film as well as observing the data image through the camera view finder.

2. Description of the Prior Art

The U.S. Pat. No. 4,001,850 discloses a data recording camera capable of recording a data image on photosensitive material as well as observing the data image through the camera view finder. In order to record the data image on the photosensitive material as well as observe the data image, it is necessary to divide the light beam into two beams and direct one beam toward the photosensitive material and the other beam toward the view finder.

When the light beam from the data is divided by means of the light beam dividing device or beam splitter, an unnecessary light beam is formed by internal reflection of the light beam dividing device. This forms a ghost image in addition to the data image. The ghost image is generally dimmer than the data image so that it causes little difficulty in the view finder system. However it may be recorded on the film.

Although it is possible to limit the ghost image by making the beam dividing device with very thin layers, such a beam splitter is so expensive that its use would be unprofitable in a camera.

SUMMARY OF THE INVENTION

A purpose of the present invention is to provide a data recording camera of comparatively unexpensive optical elements and capable of eliminating recordation of the ghost image on the photosensitive material.

The purpose can be achieved by arranging in the path of the ghost light beam produced in the light beam dividing device optical elements substantially eliminating the ghost light beam.

DESCRIPTION OF PREFERRED EMBODIMENT

Figure 1:
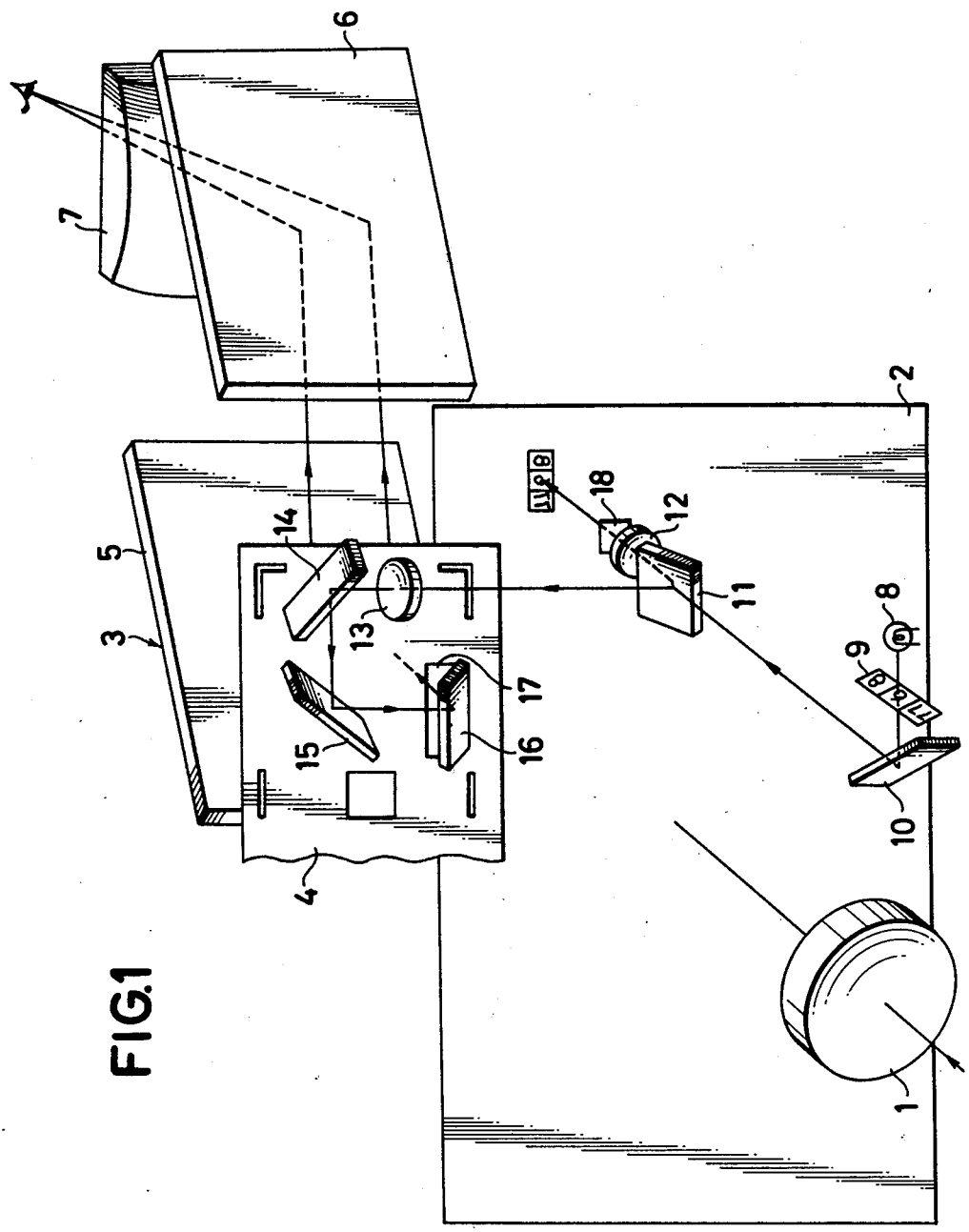
FIG. 1 shows an optical arrangement of the data printing camera in accordance with the present invention.

In FIG. 1, an objective lens 1 of a camera directs light onto film 2 arranged in the image plane of the objective lens. A view finder optical system 3 is capable of range finding. A mask 4, used for obtaining a distance measuring beam, is partially shown in the drawing. A reflective mirror 5 has an angle of inclination which is varied by the focus adjustment of the objective lens. A half-permeable mirror 6 interposes the light beam from the mirror 5 upon the light beam from a finder lens not shown in the drawing. Member 7 is an eye piece lens. As the above elements are all well known their details will be omitted here.

A light source 8 illuminates data 9, while a mirror 10 directs the light beam from the data toward the half-permeable mirror 11. Arranged in the optical path of the light beam that has passed through the half-permeable mirror is an image forming lens 12. The latter serves to form an image of the data on a part of the film 2. A lens 13, in the light beam reflected by the half-permeable mirror 11, forms an image of the data 9 near the opening 17 of the mask 4 after being reflected by the mirrors 14, 15 and 16. In consequence, the image of this data can be observed through the eye piece 7.

Figure 2:
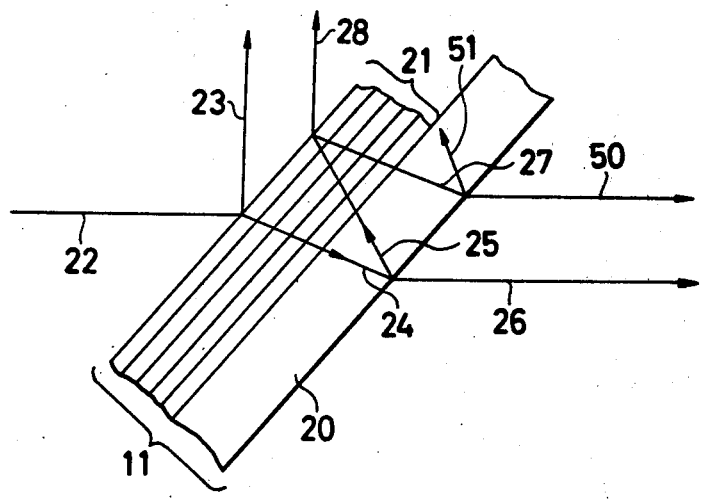
FIG. 2 shows a drawing for explaining the growth of the ghost image due to the beam divider.

In such a data printing camera, a ghost image may be formed by the reflection on the other surface of the half-permeable mirror 11. The reason for existence of the ghost image will be evident from consideration of FIG. 2. In FIG. 2, the member 20 is the glass base plate of the slantly provided half-permeable mirror 11. On the upper surface of this glass base plate is an interference layer 21 composed of layers of high refractive index and those of low refractive index. A light beam 22 comes from the data. A light beam 23 is reflected by the interference layer 21 and a light beam passes through the interference layer 21. A major portion 26 of the light beam 24 passes through the glass base plate 20. However a part 25 of the beam 24 is internally reflected by the other surface of the base plate 20. The light beam 25 internally reflected onto the other surface is again divided at the interference layer 21 into one reflected beam 27 and another beam 28 passing through the layer 21. The beam 28 advances nearly parallel to the reflected beam 23. This beam forms a ghost in the view finder. However, the intensity of the beam 28 is very small in comparison with the beam 23. Because the human eye has no integrating effect, this ghost image is not recognizable and causes little difficulty.

The light beam 27 reflected inwardly onto the interference layer 21 also advances parallel to the light beam 26 and toward the film. The ratio of the intensity of the light beam 27 to 26 is larger than the ratio of the intensity of the light beam 28 to 23. Because the film has an integrating effect, an image translated parallel to the data image formed with the light beam 26 is recorded on the film plane 2. The present invention relates to a data printing camera free from such a ghost image.

The first method for eliminating the ghost image makes use of a polarization filter (polar screen). It is generally well known that when a light beam is angularly incident upon a half-permeable mirror, the ratio of the polarized part in the same direction to the polarized part in another direction, of the light beam reflected on the mirror, is the reverse of that of the light beam passing through the mirror. Thus, the content of the polarized part of the light beam 26 is reversed to that of the light beam 50. Namely, the polarized part of same direction of the light beam 26 is comparatively small while that of the light beam 50 is large. In consequence, when the polarized part is eliminated by a polarization filter (polar screen), the amount of the light beam 50 is decreased more than that of the light beam 26. The polarization filter (polar screen) 18 arranged behind the lens 12 in FIG. 1 serves to produce the above effect. Namely, the ghost image can be eliminated by means of this polarization filter (polar screen) 18.

For removing the ghost beam 50 efficiently, the polarization filter (polar screen) 18 positioned between said light dividing device 11 and film 2 may be oriented so its polarized direction is parallel to the reflection plane of the light beam dividing device.

Figure 3:
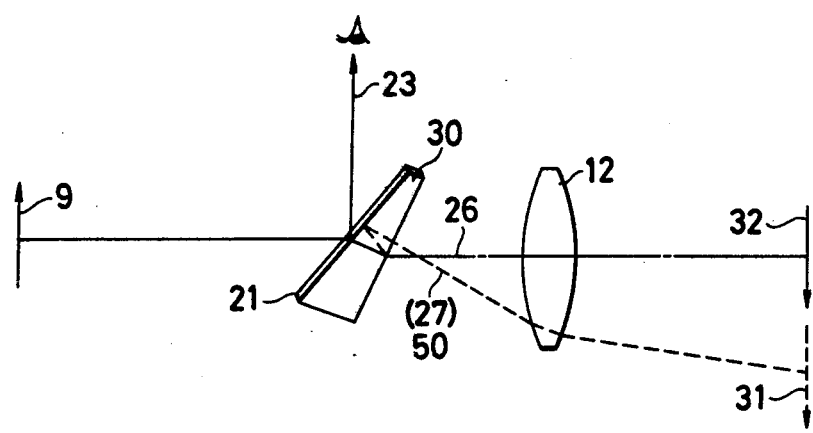
FIG. 3 shows an embodiment in which the ghost image is eliminated by means of a wedge prism.

In FIG. 3, the ghost image is eliminated by forming the glass base plate 20 as a wedge prism 30. The wedge prism 30 separates the light beam 27 sufficiently from the light beam 36. In consequence, the ghost image 31 is formed sufficiently far from the data image, namely out of the film plane.

Figure 4:
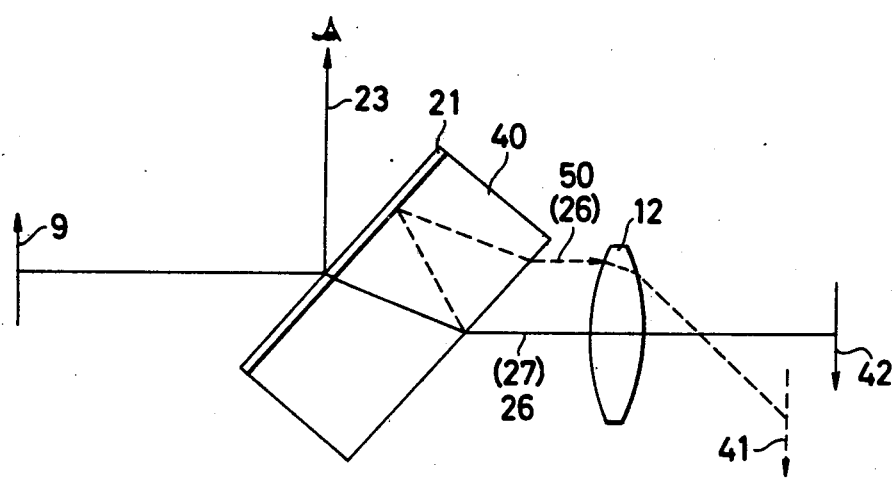
FIG. 4 shows an embodiment in which the ghost image is eliminated by means of a thick glass plate.

In FIG. 4, the ghose image is eliminated by forming the glass base plate 20 with glass 40 sufficiently thick so that the length of the path of the light beam 26 up to the lens 12 becomes longer than that of the light beam 27. Consequently, the ghost is out of focus on the film plane. The amount of light energy per unit area of this out of focus ghost image is then small enough not to be recorded. Thus, the data image 42 can be recorded, while the ghose image 41 can not be recorded.

What is claimed is:

1. A data recording camera comprising:
   an image forming optical system for forming the image of the object to be photographed on the photosensitive material;
   a view finder optical system for observing the object to be photographed;
   means forming data;
   a light beam dividing device for directing the light beam from the data toward the photosensitive material and the view finder optical system, said dividing device producing a ghost light beam forming on the photosensitive material a ghost image of the data being produced due to the internal reflection of said light beam dividing device;
   an optical system for forming the data image on the photosensitive material;
   an optical system for forming the data image in the view finder; and
   an optical member arranged in the path of the ghost light beam to substantially eliminate the ghost light beam.

2. A data recording camera in accordance with claim 1, wherein the light beam dividing device includes interference layers, the member for eliminating the ghost light beam being a polarization filter (polar screen) for eliminating the ghost light beam.

3. A data recording camera in accordance with claim 2, said polarization filter (polar screen) is positioned between said light beam dividing device and photosensitive material and is oriented with its polarized direction parallel to the reflection plane of the light beam dividing device.

4. A data recording camera in accordance with claim 1, wherein the member for eliminating the ghost light beam is a wedge prism.

5. A data recording camera in accordance with claim 1, wherein the member for eliminating the ghost light beam is a thick glass plate.

* * * * *